United States Patent
Okita et al.

(10) Patent No.: US 6,171,411 B1
(45) Date of Patent: Jan. 9, 2001

(54) ROLLING BEARING

(75) Inventors: Shigeru Okita; Susumu Tanaka, both of Kanagawa (JP)

(73) Assignee: NSK Ltd., Tokyo (JP)

(*) Notice: Under 35 U.S.C. 154(b), the term of this patent shall be extended for 0 days.

(21) Appl. No.: 08/901,779

(22) Filed: Jul. 28, 1997

(30) Foreign Application Priority Data

Jul. 26, 1996 (JP) .................................................. 8-198128

(51) Int. Cl.$^7$ .................................................. C23C 8/22
(52) U.S. Cl. .................. 148/319; 148/318; 148/906; 384/492; 384/912
(58) Field of Search .................................. 148/333, 906, 148/318, 319; 420/104, 128; 384/492, 912

(56) References Cited

U.S. PATENT DOCUMENTS

| | | | |
|---|---|---|---|
| 4,642,219 | * 2/1987 | Takata et al. | 420/104 |
| 4,871,268 | * 10/1989 | Furumura et al. | 384/492 |
| 5,352,303 | * 10/1994 | Murakami et al. | 148/318 |
| 5,413,643 | * 5/1995 | Murakami et al. | 148/319 |
| 5,705,124 | * 1/1998 | Ochi et al. | 420/105 |

FOREIGN PATENT DOCUMENTS

| | | |
|---|---|---|
| 0626468 | 11/1994 | (EP) . |
| 1354828 | 5/1974 | (GB) . |
| 2294058 | 4/1996 | (GB) . |
| 2294270 | 4/1996 | (GB) . |
| 2306506 | 5/1997 | (GB) . |

\* cited by examiner

*Primary Examiner*—John Sheehan
(74) *Attorney, Agent, or Firm*—Sughrue, Mion, Zinn, Macpeak & Seas, PLLC

(57) ABSTRACT

Disclosed is a rolling bearing comprising an inner race, an outer race, and a plurality of rolling elements, at least one of the inner race and the outer race being formed of an alloy steel which comprises:

$0.7 \leq C \leq 0.9\%$ by weight;

$0.1 \leq Si \leq 0.5\%$ by weight;

$0.5 \leq Mn \leq 1.1\%$ by weight;

and $0.1 \leq Cr \leq 0.6\%$ by weight;

and including, in its surface layer, at least one of $0.8 \leq C \leq 1.4\%$ by weight and $0.01 \leq N \leq 0.3\%$ by weight. The rolling bearing can be obtained at an extremely low cost and has a long life in a severe environment particularly under contaminated lubrication.

1 Claim, 2 Drawing Sheets

ROLLING BEARING

FIELD OF THE INVENTION

This invention relates to a rolling bearing used in automobiles, agricultural machinery, and constructional machinery. More particularly, it relates to a rolling bearing which has a long bearing life even under contaminated lubrication as demanded for use in driving systems, such as a transmission and an engine.

BACKGROUND OF THE INVENTION

Rolling bearings are generally made of bearing steel or case hardening steel which is to be carburized. Since rolling bearings are to be used with a shearing stress repeatedly imposed thereon under a high contact pressure, bearing steel is subjected to hardening and tempering, and case hardening steel is subjected to carburizing followed by hardening and tempering in order to secure a rolling fatigue life withstanding the shearing stress.

Compared with case hardening steel requiring carburizing, bearing steel is largely advantageous in terms of cost of heat treatment, reducing the total cost of production. However, bearing steel is disadvantageous from the standpoint of workability of the raw material and has an insufficient rolling life under a severe running condition. In order to overcome these disadvantages of bearing steel, techniques for improving the raw material workability to further reduce the production cost and for extending the rolling life have been proposed as disclosed, e.g., in JP-A-8-3689 and JP-A-8-53735 (the term "JP-A" as used herein means an "unexamined published Japanese patent application").

On the other hand, case hardening steel is, while economically disadvantageous, advantageous for its longer rolling life. In recent years, however, the working environment of bearings has been getting stricter. In particular, there has been a demand for extension of a life under contaminated lubrication as well as reduction of cost. Under these circumstances, the state-of-the-art case hardening steel cannot sufficiently meet the demands of life and cost.

The applicant previously proposed in JP-A-2-125841 a long-life rolling bearing made of an economical raw material which has a reduced Cr content (Cr is ready to precipitate into a carbide harmful to the life) and has added thereto as much Mn as the reduction of Cr to secure hardenability and which has an increased carbon content to improve productivity in heat treatment.

JP-A-8-4774 proposes increasing the carbon content of a raw material thereby to cut the cost of heat treatment, adding Si to the raw material, and subjecting the raw material to carburizing thereby to improve the life under contaminated lubrication.

According to the conventional techniques as taught by JP-A-8-3689 and JP-A-8-53735, somewhat extended durability of bearing steel has been attained, but no considerations has been given to the life under contaminated lubrication to cope with the recent environment of use of bearings.

The technique of JP-A-2-125841 aims at obtaining a rolling bearing having a long life under contaminated lubrication by retaining austenite in the surface layer in a proportion of 25 to 45% by volume. This can be achieved by setting the dissolved carbon content of at least the surface layer at 0.8% by weight or more so as to keep the retained austenite content within the above range. However, considering the case in which the carbonitrided surface is ground, the machinability (grindability) greatly varies depending on the surface nitrogen content, and the surface nitrogen content is decided by the alloying elements of the raw material and the conditions of heat treatment. From this viewpoint the technique of JP-A-2-125841 still has room for further improvement for reducing the total production cost, while paying due attention to efficiency of carburizing and grindability after carbonitriding as well.

Attention is not paid to the grindability after heat treatment in JP-A-8-4774, either. That is, considerations for not only grindability but materials, heat treatment, etc. are insufficient in making a reduction of production cost.

In other words, although the above-mentioned techniques have achieved an extended bearing life through improvement on bearing steel raw material that is economically advantageous, the life reached is still not equal to that of bearings made of carburized or carbonitrided case hardening steel. On the other hand, attempts to reduce the cost of case hardening steel that is to be carburized or carbonitrided have not succeeded in providing bearings competitive in price with normally hardened articles made of bearing steel.

SUMMARY OF THE INVENTION

Attention being paid to these problems of conventional techniques, an object of the present invention is to provide a rolling bearing which has a long life under contaminated lubrication and yet is less expensive than conventional bearings made of bearing steel.

The present invention provides a rolling bearing comprising an inner race, an outer race, and a plurality of rolling elements, wherein at least one of the inner race, outer race, and rolling elements is formed of an alloy steel comprising 0.7 to 0.9% by weight of C, 0.1 to 0.5% by weight of Si, 0.5 to 1.1% by weight of Mn, 0.1 to 0.6% by weight of Cr, and the balance of Fe and unavoidable impurity elements, and has a surface layer containing at least one of, carbon and nitrogen atoms, with the proviso that the carbon content is 0.8 to 1.4% by weight and the nitrogen content is 0.01 to 0.3% by weight. It is particularly preferred that at least one of the inner race and outer race satisfies such requirements.

In order to accomplish the above object, the inventors of the present invention have thoroughly studied all the steps involved in a process for producing a rolling bearing which comprises forging (cold forging, warm forging, hot forging, etc.), rolling and turning if necessary, heat treatment, and grinding and various possible combinations of raw materials applicable to bearings and methods of heat treatment. As a result, they have developed a novel rolling bearing having excellent rolling fatigue life under contaminated lubrication which is obtained from a raw material suitable to every working step for completing a bearing and containing minimum alloying elements and thus reached the present invention.

DETAILED DESCRIPTION OF THE INVENTION

Figure 1:
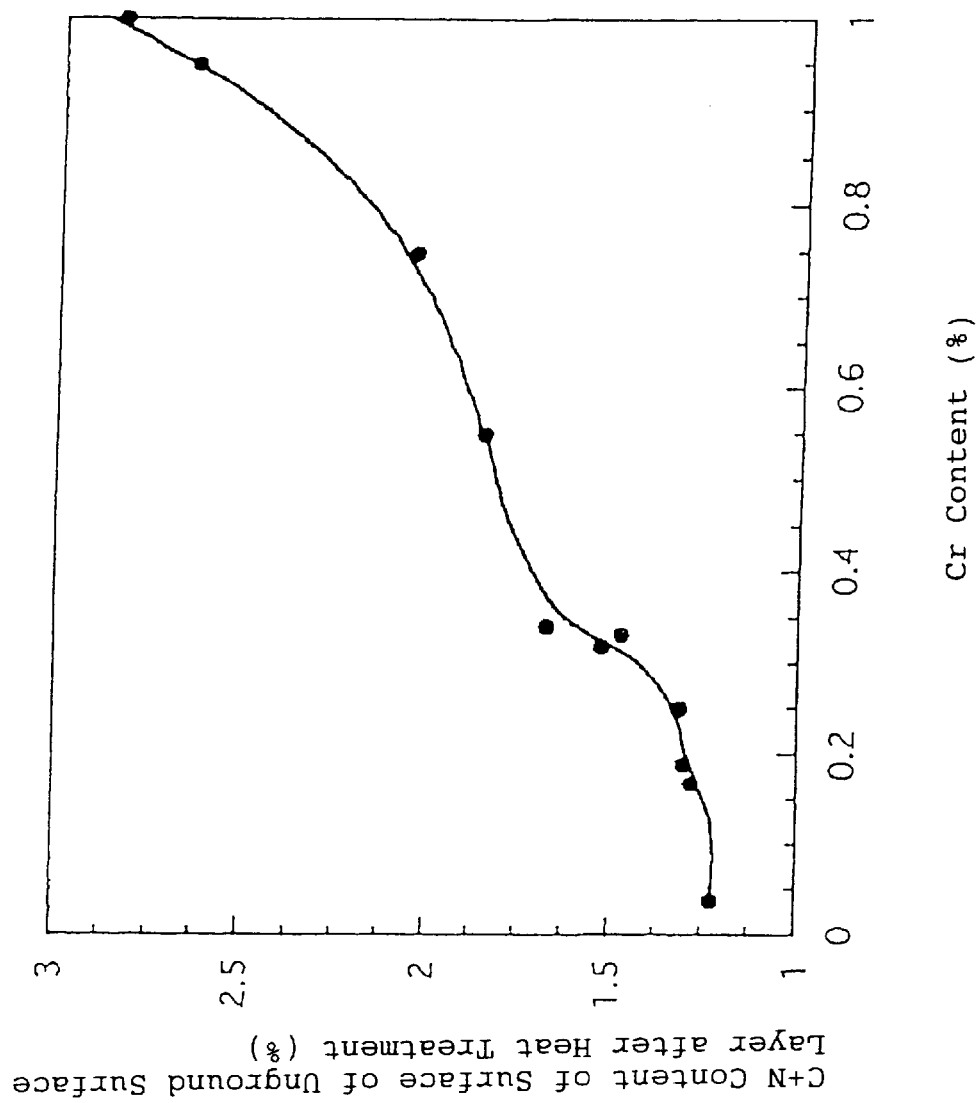
FIG. 1 is a graph showing the critical significance of the Cr content in a bearing material.

The development of the rolling bearing of the present invention is based on the following findings.

(1) In general, raw materials containing Si or Mn that serves to strengthen ferrite or C or Cr that forms carbides in amounts more than necessary exhibit reduced workability in forging, rolling and turning. As a result of total study on such workability as well as hardenability, heat treatment characteristics, and life characteristics, it has been found that the Si and Cr contents can be minimized by addition of adequate amounts of C and Mn.

(2) In order to secure necessary bearing functions, primarily a rolling life, while minimizing the alloying elements, the raw material of the rolling bearing according to the present invention is subjected to carburizing or carbonitriding. In general, if a raw material contains such elements as Cr, Mn, Mo and V that form carbides or carbonitrides upon these treatments in amounts more than necessary, a large amount of carbides or carbonitrides are precipitated in the surface layer and interferes with grinding. Further, such carbides or carbonitrides as cause reduction in rolling life sometimes remain in the surface layer of a finished bearing after grinding. Furthermore, the above-mentioned carbide-forming elements and Si generally tend to make the carburizing or carbonitriding layer shallower. For example, the depth of carburizing tends to become smaller with an increase in Cr content (see *TEKKO TO GOKINGENSO* (*Steel and Alloying Elements*), p. 306, Japan Society for the Promotion of Science, The 19th Steel Committee (Dec., 6, 1971)). In particular, Cr and Si cause a considerable reduction in depth of a nitrogen diffusion layer formed by carbonitriding.

Having taken note of these tendencies, the inventors have confirmed that, of various alloying elements necessary for making up of a bearing material, Si and Cr that are generally taken as primary components are minimized to prepare low alloy steel, whereby heat treatment characteristics are improved, leading to satisfactory rolling fatigue life.

(3) On the other hand, a rolling bearing repeatedly receives a shearing stress under a high contact pressure so that it is required to have certain hardness from its surface to a certain depth so as to secure fatigue life. Further, in order to secure a life under contaminated lubrication, the surface layer should have not only hardness but at least a given amount of retained austenite. That is, it is necessary to incorporate elements that improve hardenability to provide certain hardness upon heat treatment and elements that form retained austenite.

Based on the above findings, in the present invention, appropriate amounts of C and Mn are added to the matrix, the raw material is carburized or carbonitrided, and Si and Cr contents in the raw material are reduced to the lowest possible levels, thereby to secure heat treatment quality demanded for life characteristics. According to the present invention, a cheap raw material is subjected to an optimum heat treatment to produce a rolling bearing having a long life under contaminated lubrication at a remarkably reduced production cost. That is, a cheap raw material can be made sufficiently useful as a bearing material. For example, structural carbon steel for machinery which is generally accepted hardly useful as a bearing material can be made usable by increasing its carbon content, or tool carbon steel can be made usable by adding a trace amount of Mn.

The embodiments for carrying out the present invention will be shown below, starting with the action of alloying elements composing a raw material for the rolling bearing of the invention and the grounds for limiting the contents of the elements.

1) C Content: 0.7 to 0.9 wt %

A finished product having an appropriate amount of retained austenite ($\gamma_R$) and a residual compressive stress in its surface layer and thereby exhibiting a long life under contaminated lubrication can be obtained even from low alloy steel by conducting carburizing or carbonitriding. Since an increase in heat treating time raises the production cost, the lower limit of the carbon content should be 0.7% by weight so that a sufficient depth of a hardened layer and a sufficient retained austenite content for obtaining a satisfactory life may be achieved by carburizing or carbonitriding for as short a time as the hardening time of conventional bearing steel.

As the carbon content of a raw material increases, resistance against deformation in cold working tends to increase. Even with the contents of alloying elements reduced, a bearing material having a C content exceeding 0.9% by weight reduces the life of a tool. Moreover, if the C content exceeds 0.9% by weight, soaking would be needed in steel making so as to eliminate macro carbides or segregation.

For the above reasons, the carbon content of a raw material should range from 0.7 to 0.9% by weight. Where a life and cost of heat treatment are to be considered strictly, the carbon content is desirably 0.8% by weight or more for securing a sufficiently long life through a short-time heat treatment.

2) Cr Content: 0.1 to 0.6 wt %

Cr is an element for strengthening the matrix to obtain improved hardenability and improved resistance against temper softening. Cr should be present in an amount of at least 0.1% by weight in order to draw its effects effectively. If the Cr content exceeds 0.6% by weight, soaking is necessary to suppress formation of macro carbides or segregation in steel making, which entails additional cost plus the cost of Cr. Further, an increase in Cr or Si content in addition to C content tends to increase resistance to deformation in cold working.

For these reasons, the Cr content of a raw material should range from 0.1 to 0.6% by weight.

The depth of a diffusion layer after carburizing or carbonitriding reduces depending on the Cr content. The relationship between Cr content and C+N content of the unground surface layer is shown in FIG. 1. It is seen that the C+N content of the unground surface layer abruptly rises as the Cr content exceeds 0.3% by weight. This means that C and/or N are accumulated on the surface, failing to provide a sufficient depth of a diffusion layer especially when the heat treating time is short. Therefore, the Cr content of a raw material is desirably 0.3% by weight or less for obtaining a sufficient life through a short-time heat treatment.

3) Mn Content: 0.5 to 1.1 wt %

While Mn or Cr is usually added for improving hardenability, not all Cr functions to improve hardenability of the matrix because it is a carbide-forming element. Besides, Mn is less expensive than Cr. Accordingly, in order to impart sufficient hardenability with a small Cr content, and also considering that Mn is an element forming retained austenite which is effective on a rolling life under contaminated lubrication, the Mn content should be added in an amount of at least 0.5% by weight. Since Mn also serves to strengthen ferrite of a raw material, cold workability is noticeably reduced if the Mn content exceeds 1.1% by weight particularly where the raw material has a carbon content of 0.7% by weight or more. Accordingly, the upper limit of the Mn content is set at 1.1% by weight.

For these reasons, the Mn content of a raw material is to range from 0.5 to 1.1% by weight.

4) Si Content: 0.1 to 0.5 wt %

Si acts as a deoxidizer in making a raw material into steel, improving hardenability and strengthening the martensite matrix, and is therefore effective in extending the life of a bearing. Si should be added in an amount of at least 0.1% by weight so as to enjoy its effects. If the Si content is excessive, however, machinability, forging properties, and cold workability are deteriorated, and the depth of a diffusion layer formed by carburizing or carbonitriding is reduced. Therefore, the upper limit of the Si content is 0.5% by weight. For these reasons, the Si content of a raw material is limited to a range of from 0.1 to 0.5% by weight.

Figure 2:
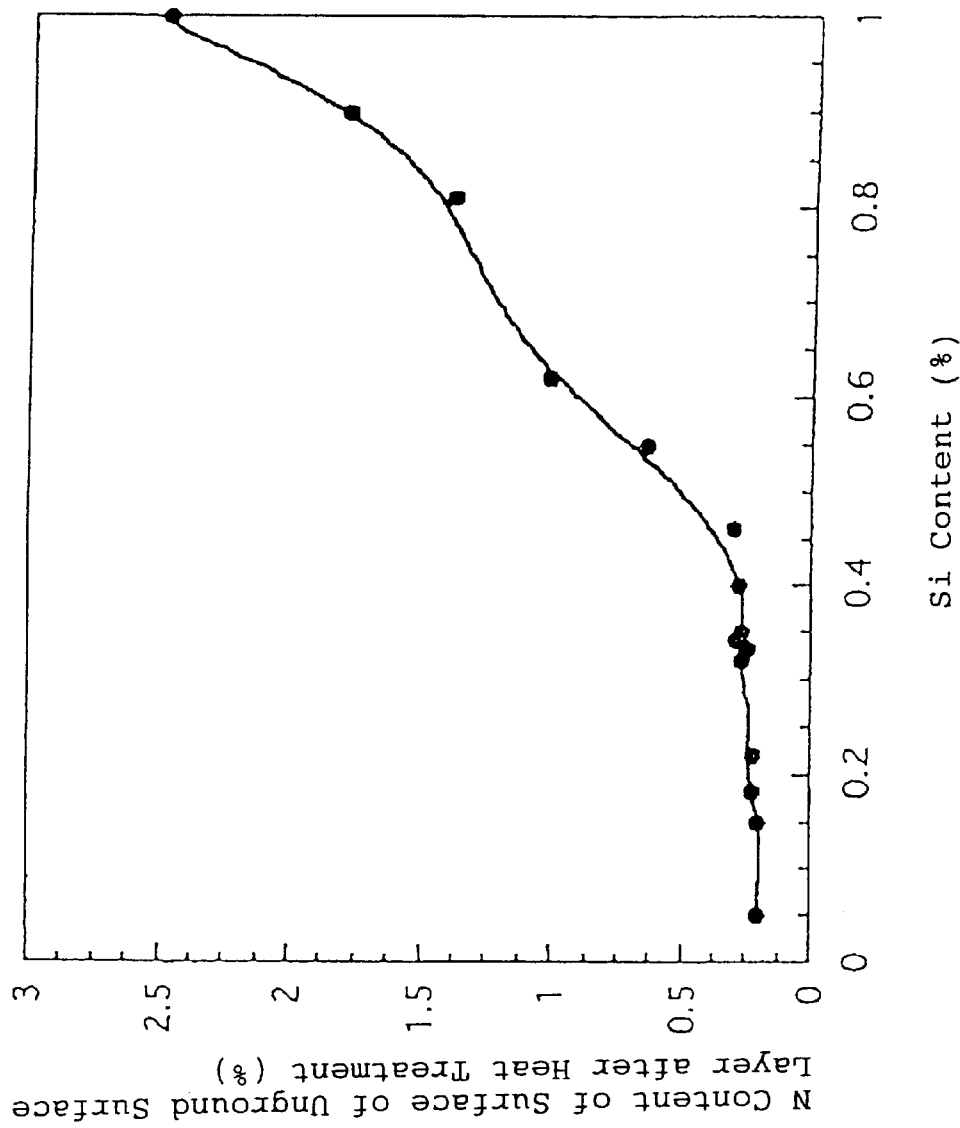
FIG. 2 is a graph showing the critical significance of the Si content in a bearing material.

Because Si increases the depth of the grain boundary oxidation layer or density of the surface layer during carburizing or carbonitriding, tending to reduce the mechanical strength. In the case of bearings produced by heat treatment followed by grinding, Si lessens the strength of the part that is not subjected to grinding, Therefore, the Si content is preferably as low as possible. Where carbonitriding is carried out, Si hinders diffusion of nitrogen, resulting in a reduction in depth of a diffusion layer. In addition, nitrogen is thickened in the surface after heat treatment, which greatly impairs machinability in the subsequent grinding. In FIG. 2 is shown the relationship between Si content and N content of the unground surface layer after heat treatment. It is seen that when the Si content exceeds 0.5% by weight, the nitrogen content of the unground surface layer steeply rises, resulting in serious deterioration of grindability. In this connection, JP-A-6-341441 revealed that the relationship between N content of unground surface layer and grindability, describing that grindability is appreciably reduced if the nitrogen content of an unground surface layer exceeds 0.3% by weight and that a preferred nitrogen content is 0.25% by weight or less. As can be seen from FIG. 2, the nitrogen content of the unground surface layer exceeds 0.25% by weight as the Si content exceeds 0.3% by weight. Accordingly, where carbonitriding is carried out, the Si content is preferably not more than 0.3% by weight.

As stated above, the bearing material according to the present invention is supplied at a price considerably below that of conventional bearing steel, can be worked at a minimized cost, and can be carburized or carbonitrided in a short time. It follows that the overall production cost of the bearings obtained from the material is below that of bearings made of conventional bearing steel. Note that the raw material used in the present invention has a high C content and that the resulting bearing has a high total content of retained austenite as a result of carburizing or carbonitriding. In particular, a sufficient amount of retained austenite should be present in the surface layer as a means for securing a long life. As a result, there is a tendency that the dimensional stability, which is an important property required of a bearing, is deteriorated. Deterioration of dimensional stability is attributed to decomposition of retained austenite into martensite or ferrite and pearlite during use of the bearing. It is preferable, therefore, for the bearing of the present invention to be used at a temperature of not higher than 120° C. at which the rate of decomposition of retained austenite is sufficiently low. Where the bearing material is subjected to carbonitriding, the surface layer after carbonitriding has increased resistance to tempering owing to dissolution of nitrogen. In this case, the bearing is preferably used at a temperature of not higher than 130° C. Where the temperature of use exceeds the above point, it is desirable that the bearing material of the present invention be used as rolling elements of a bearing to which dimensional stability is less important.

5) C Content of Finished Surface Layer: 0.8 to 1.4 wt %

Carbon is indispensable to hardness and retained austenite required for a bearing. It should be present in an amount of at least 0.8% by weight so as to secure a long bearing life. However, if the carbon content exceeds 1.4% by weight, there is a fear that macro carbides, such as $M_3C$ (M:metal), which deteriorate grindability, life, and strength are precipitated in quantity.

For these reasons, the carbon content of a finished surface layer of the bearing should range from 0.8 to 1.4% by weight.

6) N Content of Finished Surface Layer: 0.01 to 0.3 wt %

Nitrogen serves for formation of retained austenite and for improvement of resistance to tempering thereby to contribute to extension of a bearing life and improvement in heat resistance and wearability. However, that the N content of a surface layer of a finished bearing exceeds 0.3% by weight suggests that the surface layer after the heat treatment must have had a higher N content. Such a high N content after the heat treatment means considerably poor grindability. This is the reason why the N content of a finished surface layer should be not more than 0.3% by weight.

The bearing of the present invention is obtained by carburizing or carbonitriding. Carbonitriding is preferred to carburizing because carbonitriding results in strengthening of the structure by solid solution of nitrogen and formation of fine precipitates of carbonitrides, thereby to bring about improvements in life, heat resistance, and wearability. In some cases, carburizing of a steel material is accompanied by solid solution of slight nitrogen, but the amount of dissolved nitrogen is about 0.02% by weight, while varying depending on the alloying elements, not enough to produce effects in improving the life or wear characteristics. At least 0.05% by weight of nitrogen is required for obtaining such effects. If the nitrogen content exceeds 0.2% by weight, nitrides, such as $M_4N$ (M:metal), precipitate, which tends to bring about improved wearability but reduce grindability. In short, the rolling bearing of the present invention is preferably produced by subjecting the raw steel material to carbonitriding, and the nitrogen content of the finished surface layer is in the range of from 0.01 to 0.3% by weight, preferably from 0.05 to 0.2% by weight.

EXAMPLES

In what follows will be described the composition of the raw materials used in the production of rolling bearings according to the present invention, whether or not soaking is needed, and evaluations made on workability of the raw materials in a simulation of ordinary steps involved in production of an inner race, an outer race, and rolling elements.

(I) Components, Need of Soaking, and Evaluation of Turning Workability and Header Workability Outer and inner races of a bearing are usually produced by warm forging or hot forging, annealing, and turning. Some rolling elements are produced by turning similarly to outer and inner races, and others by cold working (header working) of a coil material as is usual mostly in the production of small bearings. Turning workability and header workability of Examples and Comparative Examples having an alloy composition shown in Table 1 below were evaluated in terms of a tool life and a mold life, respectively, under the following conditions.

Conditions of Evaluation

1) Necessity of Soaking

The cross section of a billet of a raw material was examined macroscopically and microscopically to see whether or not macro carbides or thick segregation bands which are harmful to the life had been formed.

2) Cutting Tool Life
   Cutting machine: high-speed.lathe
   Tool: P10 (JIS B 4053)
   Cutting speed: 180 to 220 m/sec
   Running rate: 0.2 to 0.3 mm/rev
   Depth of cut: 0.6 to 1.0 mm Each sample was ground under the above conditions in accordance with the cutting test method specified in JIS B4011. The time required until the wear of the flank of the cutting tool reached 0.2 mm was taken as the life of the tool. The bearing materials used in Examples and Comparative Examples were high carbon steel, and they had been spheroidized by heating to at least the $A_1$ point (the temperature at which α-iron is converted into γ-iron) of the material before turning. SCr420 (Comparative Example) had been softened by heating to a temperature below the $A_1$ point in a usual manner.

3) Mold Life
   Mold: V30 (JIS B4053)
   Upsetting ratio: 15 to 20%
   Working speed: 300 to 400 workpieces per minute
   Lubrication: zinc phosphate coating film+lubricant Each steel species was worked under the above conditions. The number of the workpieces that could be worked until the mold developed cracks or broke to give scratches or deformation to the workpieces.

In Table 1 are also shown whether or not the sample needed soaking and the results of evaluations on header workability in terms of a mold life and a turning tool life.

Steel species having a C content exceeding 0.9 wt % (C13 and SUJ2) or a Cr content exceeding 0.6 wt % (C19) were judged to need soaking.

Steel species having a C content exceeding 0.9 wt % (C13 and SUJ2) or an Mn content exceeding 1.1 wt % (C17) have reduced workability, considerably reducing the mold life. Those having an Si content exceeding 0.5 wt % (C15) or a Cr content exceeding 0.6 wt % (C19) tend to have reduced workability.

Steel species having a C content exceeding 0.9 wt % or an Mn content exceeding 1.1 wt % exhibit reduced workability, considerably reducing the tool life. Those having an Si content exceeding 0.5 wt % or a Cr content exceeding 0.6 wt % also tend to have reduced workability.

(II) Heat Treating Conditions and Evaluation of Grindability

The steels shown in Table 1 each were worked into an inner race. After subjected to heat treatment as described below, each inner race was subjected to a grinding test.

The conditions of heat treatment were as follows.

TABLE 1

|  | Steel Species | C (wt %) | Si (wt %) | Mn (wt %) | Cr (wt %) | Soaking* | Mold Life (×10$^6$) | Tool Life (min) |
|---|---|---|---|---|---|---|---|---|
| Examples | C1 | 0.78 | 0.36 | 0.81 | 0.32 | No | 219 | 225 |
|  | C2 | 0.85 | 0.22 | 0.85 | 0.33 | No | 215 | 218 |
|  | C3 | 0.84 | 0.34 | 0.82 | 0.25 | No | 213 | 216 |
|  | C4 | 0.88 | 0.36 | 0.83 | 0.33 | No | 203 | 210 |
|  | C5 | 0.72 | 0.37 | 0.85 | 0.34 | No | 250 | 220 |
|  | C6 | 0.82 | 0.47 | 0.83 | 0.32 | No | 205 | 205 |
|  | C7 | 0.84 | 0.15 | 0.83 | 0.33 | No | 223 | 220 |
|  | C8 | 0.85 | 0.33 | 1.03 | 0.32 | No | 201 | 202 |
|  | C9 | 0.82 | 0.34 | 0.58 | 0.34 | No | 235 | 220 |
|  | C10 | 0.84 | 0.35 | 0.84 | 0.55 | No | 206 | 208 |
|  | C11 | 0.83 | 0.33 | 0.83 | 0.17 | No | 216 | 219 |
|  | C12 | 0.83 | 0.18 | 0.85 | 0.19 | No | 229 | 235 |
| Comparative Examples | C13 | 1.02 | 0.35 | 0.83 | 0.33 | Yes | 78 | 65 |
|  | C14 | 0.65 | 0.33 | 0.82 | 0.32 | No | 253 | 218 |
|  | C15 | 0.83 | 0.62 | 0.83 | 0.31 | No | 168 | 122 |
|  | C16 | 0.83 | 0.05 | 0.83 | 0.34 | No | 228 | 232 |
|  | C17 | 0.84 | 0.32 | 1.23 | 0.33 | No | 75 | 63 |
|  | C18 | 0.82 | 0.34 | 0.35 | 0.32 | No | 246 | 241 |
|  | C19 | 0.85 | 0.34 | 0.83 | 0.75 | Yes | 152 | 112 |
|  | C20 | 0.82 | 0.33 | 0.84 | 0.04 | No | 227 | 223 |
|  | SUJ2 | 1.01 | 0.23 | 0.32 | 1.45 | Yes | 56 | 55 |
|  | SCr420 | 0.21 | 0.25 | 0.78 | 0.95 | No | 196 | 265 |

*Yes: Soaking was needed.
No: Soaking was not needed.

TABLE 2

| | Sample No. | Steel Species | Heat Treatment | Number of Ground Samples | C Content of Finished Surface (wt %) | N Content of Finished Surface (wt %) |
|---|---|---|---|---|---|---|
| Examples | 1 | C1 | A | 24 | 0.99 | 0.12 |
| | 2 | C1 | B | 27 | 1.02 | — |
| | 3 | C2 | A | 23 | 1.06 | 0.21 |
| | 4 | C2 | B | 26 | 1.10 | — |
| | 5 | C3 | A | 26 | 1.08 | 0.23 |
| | 6 | C6 | A | 21 | 1.03 | 0.09 |
| | 7 | C6 | B | 26 | 1.05 | — |
| | 8 | C7 | A | 26 | 1.07 | 0.21 |
| | 9 | C7 | B | 28 | 1.10 | — |
| | 10 | C8 | A | 26 | 1.03 | 0.13 |
| | 11 | C8 | B | 28 | 1.09 | — |
| | 12 | C9 | A | 25 | 1.06 | 0.14 |
| | 13 | C9 | B | 28 | 1.10 | — |
| | 14 | C10 | A | 21 | 0.98 | 0.08 |
| | 15 | C10 | B | 26 | 1.01 | — |
| | 16 | C11 | A | 26 | 1.00 | 0.22 |
| | 17 | C11 | B | 28 | 1.01 | — |
| | 18 | C12 | A | 25 | 1.01 | 0.25 |
| Comparative Examples | 19 | C1 | F | 29 | 0.78 | — |
| | 20 | C1 | E | 21 | 1.42 | — |
| | 21 | C1 | C | 8 | 1.18 | 0.33 |
| | 22 | C2 | F | 29 | 0.85 | — |
| | 23 | C2 | E | 23 | 1.56 | — |
| | 24 | C2 | C | 6 | 1.23 | 0.32 |
| | 25 | C14 | A | 24 | 0.73 | 0.21 |
| | 26 | C14 | B | 27 | 0.76 | — |
| | 27 | C15 | A | 7 | 0.86 | 0.03 |
| | 28 | C15 | B | 26 | 0.88 | — |
| | 29 | C16 | A | 27 | 1.05 | 0.22 |
| | 30 | C16 | B | 28 | 1.08 | — |
| | 31 | C18 | A | 24 | 1.06 | 0.15 |
| | 32 | C18 | B | 26 | 1.10 | — |
| | 33 | C19 | A | 9 | 0.89 | 0.06 |
| | 34 | C19 | B | 21 | 0.91 | — |
| | 35 | C20 | A | 24 | 0.98 | 0.16 |
| | 36 | C20 | B | 28 | 1.01 | — |
| | 37 | SUJ2 | F | 28 | 1.00 | — |
| | 38 | SUJ2 | A | 7 | 1.05 | 0.04 |
| | 39 | SUJ2 | B | 23 | 1.21 | — |
| | 40 | SCr420 | D | 25 | 0.98 | — |

Heat Treatment A

Carbonitriding carried out at a temperature of not lower than 840° C. and lower than 900° C. for 0.5 to 1 hour in a heat-absorbing gas atmosphere containing 0.3 to 0.7% of enriched gas and 3 to 10% of ammonia gas; followed by direct quenching; followed by tempering at 160 to 200° C. for 2 hours.

Heat Treatment B

Normal carburizing at 870 to 930° C. for as short a time as 0.5 to 1 hour; followed by direct quenching; followed by tempering at 160 to 200° C. for 2 hours.

Heat Treatment C

Carbonitriding at 840° C. or above and below 900° C. for 5 to 7 hours in a heat-absorbing atmosphere containing 0.3 to 0.7% of enriched gas and 3 to 10% of ammonia gas; followed by direct quenching; followed by tempering at 160 to 200° C. for 2 hours.

Heat Treatment D

Normal carburizing at 930 to 960° C. for 5 to 7 hours; followed by direct quenching; followed by tempering at 160 to 200° C. for 2 hours.

Heat Treatment E

High concentration carburizing at 930 to 960° C. for 5 to 7 hours; followed by direct quenching; followed by tempering at 160 to 200° C. for 2 hours.

Heat Treatment F

Holding at 830 to 860° C. for 0.5 to 1 hour; followed by hardening; followed by tempering at 160 to 200° C. for 2 hours.

For the rolling bearings of the present invention, heat treatments A and B through which both cost reduction and extension of a life can be achieved simultaneously were adopted. More specifically, heat treatment A comprising short-time carbonitriding followed by direct quenching is substantially equal in cost to usual hardening. Further, addition of carbon and nitrogen by carbonitriding brings about great improvements in function over normal hardening. If the treating temperature in heat treatment A is 900° C. or higher, more $\gamma_R$ than necessary is produced in the finished surface layer to reduce the hardness, and functions as a bearing or a bearing life are reduced. On the other hand, if the treating temperature is below 840° C., or if the treating time is longer than necessary, the unground surface layer gains more N than necessary, resulting in considerable reduction in grindability. Heat treatment B comprising short-time carburizing and direct quenching is practically equal in cost to normal, hardening. Retained austenite is formed in the surface layer by addition of carbon through carburizing. As a result, a long life is obtained particularly under contaminated lubrication. Further, a residual compressive stress is generated by carburizing, thereby bringing about improvements in function over normal hardening. If the treating temperature in heat treatment B exceeds 930° C., more $\gamma_R$ than necessary is produced in the finished surface layer despite the fact that carburizing only causes carbon addition. As a result, the hardness is reduced, and the toughness in the core portion is reduced, resulting in reduction of functions as a bearing or a bearing life. On the other hand, if the treating temperature is lower tan 870° C., or if the treating time is longer than necessary, reticulate macro carbides precipitate in the unground surface layer, which reduces grindability. Such macro carbides also tend to precipitate deep in the finished surface layer to reduce the life of the resulting bearing.

Grindability was evaluated as follows
Grinding Test
  Grinding wheel: WA100
  Grinding fluid: soluble type
  Peripheral speed of grinding wheel: 2800 to 3000 m/min A sample corresponding to the inner raceway of a rolling bearing was ground with the grinding wheel, and the state of the grinding wheel in terms of shape retention and clogging was observed. The number of samples that were ground before the grinding wheel was dressed was counted to evaluate grindability.

In Table 2 are shown the results of the grinding test carried on the samples after heat treatment under various heat treating conditions and the results of analysis on the C and N contents of the ground-finished surface layer of the resulting bearing.

Sample Nos. 1 to 18 according to the present invention achieved satisfactory grindability at low cost.

To the contrary, comparative sample Nos. 21 and 24 having been subjected to normal carburizing for 5 to 7 hours exhibited appreciably reduced grindability despite the fact that the steel species used (C1 and C2) satisfy the conditions of the present invention. This is because a large amount of nitrogen had been dissolved in the unground surface layer during the heat treatment.

In comparative sample Nos. 27, 33, and 38 having a high Si or Cr content, diffusion of nitrogen was retarded by Si or Cr. As a result, a large amount of nitrogen was dissolved in the unground surface layer to greatly reduce grindability, though the nitrogen content in the finished surface is low.

Comparative sample Nos. 20 and 23 having been subjected to high concentration carburizing for a long time and comparative sample Nos. 34 and 39 which had been subjected to short-time carburizing but had a high Cr content showed a tendency to have reduced grindability as a result of precipitation of a large quantity of carbides.

(III) Bearing Test

A bearing test was carried out on the samples of the foregoing Examples and Comparative Examples as follows. A life under clean lubrication and a life under foreign matter-contaminated lubrication were examined.

Bearing Test

The test conditions were as follows.

A thrust type bearing testing machine described in Denkiseiko Kenkyusho (ed.), *Tokusyuko Binran (Index of Special Steel)*, 1st Ed., pp. 10–21, Rikogakusha K.K. (May 25, 1969) was used. The cumulative number of times of stressing was repeated until flaking occurred on the sample bearing was plotted to obtain a Weibull distribution, from which was obtained a life $L_{10}$ of the sample. Sample Nos. 21, 24, 27, 33, and 38 that had shown serious reduction in workability in the above-described grinding test were excluded from the bearing test.

Bearing Test Under Clean Lubrication
  Contact pressure: 5200 MPa
  Number of revolution: 3000 C.P.M.
  Lubricant: turbine oil No. 68
Bearing Test Under Contaminated Lubrication
  Contact pressure: 4900 MPa
  Number of revolution: 3000 C.P.M.
  Lubricant: turbine oil No. 68
  Contaminant:
  Composition: $Fe_3C$-based powder
  Hardness: HRC52
  Particle size: 74 to 147 $\mu$m
  Concentration of contaminant: 300 ppm in lubricant The results of the bearing test are shown in Table 3.

TABLE 3

|  | Sample No. | Steel Species | $L_{10}$ under Clean Lubrication ($\times 10^7$) | $L_{10}$ under Contaminated Lubrication ($\times 10^6$) |
|---|---|---|---|---|
| Examples | 1 | C1 | 8.2 | 35.3 |
|  | 2 | C1 | 7.9 | 31.2 |
|  | 3 | C2 | 11.3 | 45.5 |
|  | 4 | C2 | 10.5 | 35.2 |
|  | 5 | C3 | 11.5 | 42.8 |
|  | 6 | C6 | 8.7 | 31.6 |
|  | 7 | C6 | 8.3 | 29.5 |
|  | 8 | C7 | 10.1 | 40.2 |
|  | 9 | C7 | 8.5 | 31.0 |
|  | 10 | C8 | 10.3 | 42.6 |
|  | 11 | C8 | 9.5 | 35.1 |
|  | 12 | C9 | 7.1 | 32.3 |
|  | 13 | C9 | 7.0 | 30.9 |
|  | 14 | C10 | 7.8 | 35.6 |
|  | 15 | C10 | 7.5 | 31.9 |
|  | 16 | C11 | 10.2 | 40.5 |
|  | 17 | C11 | 8.9 | 32.7 |
|  | 18 | C12 | 11.8 | 45.6 |
| Comparative Examples | 19 | C1 | 1.0 | 2.1 |
|  | 20 | C1 | 1.2 | 7.8 |
|  | 22 | C2 | 6.2 | 15.3 |
|  | 23 | C2 | 2.3 | 9.6 |
|  | 25 | C14 | 0.8 | 1.5 |
|  | 26 | C14 | 0.7 | 1.2 |
|  | 28 | C15 | 5.3 | 2.5 |
|  | 29 | C16 | 1.1 | 6.5 |
|  | 30 | C16 | 1.0 | 4.1 |
|  | 31 | C18 | 1.3 | 1.2 |
|  | 32 | C18 | 1.0 | 1.0 |
|  | 34 | C19 | 1.6 | 3.2 |
|  | 35 | C20 | 1.1 | 2.6 |
|  | 36 | C20 | 0.9 | 2.1 |
|  | 37 | SUJ2 | 1.4 | 1.9 |
|  | 39 | SUJ2 | 4.5 | 6.2 |
|  | 40 | SCr420 | 7.6 | 7.3 |

Sample Nos. 1 to 18 according to the present invention had a long life under both clean lubrication and contaminated lubrication. Above all, sample Nos. 1, 3, 5, 6, 8, 10, 12, 14, 16 and 18 that had been carbonitrided under heat treatment condition A exhibited a particularly long life. Of these samples having been carbonitrided, the one having its Si and Cr contents reduced appropriately (sample No. 12) had the longest life.

In contrast, comparative sample Nos. 19 and 22 that had been subjected to normal hardening and tempering (heat treatment F.) were short of strengthening by solid solution of carbon and nitrogen, having no residual compressive stress on their surface layer, and therefore did not have as long a life as expected. In particular, the life of sample No. 19 was shorter due to insufficient hardness partly because the C content was not more than 0.8% by weight. On the other hand, sample No. 22 having appropriately reduced Si and Cr contents had more dissolved carbon and more retained austenite than bearings made of conventional bearing steel having been subjected to normal hardening, thereby exhibiting the longest life of all the comparative samples.

Sample Nos. 20 and 23 having had received high concentration carburizing (heat treatment E) suffered from precipitation of macro carbides harmful to a life on the finished surface thereof and therefore had a reduced life.

Comparative sample Nos. 25 and 26, which were prepared from a raw material whose initial C content is less than the lower limit specified by the present invention (C14) by the same carburizing or carbonitriding as used in Examples (heat treatment A or B), failed to increase the C content of the finished surface layer up to 0.8% by weight, the lower limit specified by the present invention, due to the short heat treating time. As a result, hardness required for use as a bearing cannot be secured, resulting in a short life.

Comparative sample Nos. 28, 34, and 39, which were prepared from a raw material whose Si or Cr content is higher than the respective upper limit specified by the present invention by the same carburizing as carried out in Examples, showed so slow diffusion of C in carburizing that sufficient diffusion layer could not be formed by such short-time heat treatment. As a result, the life of the finished sample after grinding was no more than equal to that of those having had received normal hardening and tempering (heat treatment F) or, at the longest, slightly longer than that because of somewhat dissolved C or N.

Comparative sample Nos. 29, 30, 35, and 36, which were prepared from a raw material whose Si or Cr content is lower than the respective lower limit specified in the invention by the same carburizing or carbonitriding as carried out in Examples, failed to secure hardness necessary as a bearing on account of insufficient solid solution strengthening by Si or Cr. Their life was short particularly under clean lubrication.

Comparative sample Nos. 31 and 32, which were prepared from a raw material whose Mn content is lower than the lower limit specified in the invention by the same carburizing or carbonitriding as conducted in Examples, had a short life due to, for one thing, insufficient solid solution strengthening and, for another thing, shortage of retained austenite that is effective on a life particularly under contaminated lubrication.

Comparative sample Nos. 37 and 40 were prepared by subjecting SUJ2 or SCR420 conventionally employed as a bearing material to normal hardening followed by tempering (heat treatment F.) or normal carburizing (heat treatment D).

The former had a short life under both clean lubrication and contaminated lubrication. The latter, the carburized one, had a longer life than the former under clean lubrication and contaminated lubrication but was obviously inferior in life, especially under contaminated lubrication to the samples of Examples according to the present invention.

The present invention is applicable to various kinds of rolling bearings, inclusive of ball bearings, cylindrical roller bearings, conical roller bearings, and spherical roller bearings, either of radial type or of thrust type.

As has been fully described, the present invention consists in minimizing the alloying elements of a raw material for making at least one of the constituent members of a rolling bearing, i.e., the inner race, the outer race and rolling elements, and in subjecting the raw material to carburizing or carbonitriding under appropriately selected heating conditions so as to give specific carbon and nitrogen contents to the surface layer. As a result, there is provided a rolling bearing having an extended life even under severe running conditions involving contamination of the lubricant with foreign matter while reducing the cost of production to the lowest possible degree.

While the invention has been described in detail and with reference to specific embodiments thereof, it will be apparent to one skilled in the art that various changes and modifications can be made therein without departing from the spirit and scope thereof.

What is claimed is:

1. A rolling bearing which is used under contaminated lubrication, comprising an inner race, an outer race, and a plurality of rolling elements, at least the inner race and the outer race being formed of an alloy steel which comprises:

$0.7 \leq C \leq 0.9\%$ by weight, $0.1 \leq Si \leq 0.3\%$ by weight;

$0.5 \leq Mn \leq 1.1\%$ by weight;

and $0.1 \leq Cr \leq 0.3\%$ by weight;

and including, in its surface layer formed by carburizing or carbonitriding, at least one of $0.8 \leq C \leq 1.4\%$ by weight and $0.05 \leq N \leq 0.2\%$ by weight.

* * * * *